United States Patent Office 3,791,987
Patented Feb. 12, 1974

3,791,987
MINUTE CAPSULES HAVING WALLS OF SILICEOUS MATERIAL-HYDROXY-CONTAINING MATERIAL COMPLEX AND PROCESS FOR THEIR MANUFACTURE
Gene O. Fanger, Worthington, Ohio, assignor to The National Cash Register Company, Dayton, Ohio
No Drawing. Continuation of abandoned application Ser. No. 41,114, May 27, 1970. This application Feb. 3, 1972, Ser. No. 232,321
Int. Cl. B01j 13/02; B44d 1/02
U.S. Cl. 252—316                    4 Claims

ABSTRACT OF THE DISCLOSURE

A process is disclosed for manufacturing minute capsules, en masse, wherein the capsule walls comprise a hardened silicate material. The process includes liquid-liquid phase separation of the wall material silicate from solution as silicic acid in an aqueous capsule manufacturing vehicle by means of a glycol phase-separation-inducing material. Preferred starting materials for the present process include alkali-metal water glass and polyethylene
The present liquid-liquid phase separation can be considered to be similar to so-called "complex coacevation" of the prior art in that a complex of two polymeric materials are concentrated in the emergent liquid phase. The capsule walls are solidified by reacting the siliceous capsule wall material with an inorganic salt, viz, aluminum sulfate, calcium chloride, magnesium sulfate, iron chloride or magnesium bromide.
glycol.

---

This is a continuation of application Ser. No. 41,114, filed May 27, 1970, now abandoned.

BACKGROUND OF THE INVENTION

Field of the invention

The present invention relates to a process for manufacturing minute capsules, en masse, wherein each capsule has, as a wall, a continuous film of seamless, glass-like, silicate material and to the capsules provided by such a process. It further relates to such a process wherein the silicate material is initially deposited onto minute particles of intended capsule core material as the separated phase of a liquid-liquid phase separation from an aqueous manufacturing vehicle. More specifically, the present invention pertains to a capsule manufacturing process wherein liquid-liquid phase separation of a silicate-containing, capsule wall forming, liquid material is accomplished by interaction of the silicious system with a glycol.

The capsule of the present invention has wall material of relatively inexpensive starting materials as compared with organic hydrophilic polymeric materials utilized in the prior art. Such organic polymeric materials of the prior art also have regularly been naturally-occurring polymers of great chemical complexity and have, therefore, been difficult to control or sometimes even to analyze regarding constancy of composition. The silicates and silicic acid of the present invention are well-defined and can be manufactured with assurance of a particular quality.

Physical characteristics of inorganic, i.e., silicate-containing materials for use in capsule walls provide desirable improvements over previously-used organic capsule wall materials.

Description of the prior art

U.S. Pat. No. 2,800,457, issued July 23, 1957, on the application of B. K. Green et al. discloses a method for manufacturing minute capsules, en masse, in an aqueous manufacturing vehicle. The capsules of that patent, however, have walls of organic polymeric material.

"Soluble Silicates—Their Properties and Uses," a monograph in two volumes, by James G. Vail, published by Reinhold Publishing Corp., New York (1952) contains description of the art of silicates and silicic polymers. Also described therein are aqueous silicate systems having two liquid phases.

U.S. Pat. No. 2,408,656, issued Oct. 1, 1946, on the application of J. S. Kirk discloses a process for accomplishing liquid-liquid phase separation in a silicate vehicle through the formation of a complex joining polysilicic acid with an alcohol.

SUMMARY OF THE INVENTION

Minute capsules and processes for their manufacture have been known for a long time. Absent from the prior art, however, has been disclosure of a capsule having inorganic material as the major constituent of the capsule wall. In the past, capsule walls have been substantially of organic polymeric materials which materials have been subject to many difficulties; high expense, non-uniformity of composition and sensitivity to ambient conditions being numbered among deficiencies of the organic capsule wall material.

The present invention provides minute capsules having walls of substantially inorganic polymeric material and a process for manufacturing those capsules, en masse. It is an object of the present invention to provide a process for manufacturing capsules which have, as walls, a complex of inorganic polymeric material and a polyhydroxy material. It is more specifically an object of the present invention to provide such a process wherein the inorganic polymeric material is a silicate or polysilicic acid and wherein the polyhydroxy material is a polyethylene glycol.

It is an object of the present invention to provide capsules having improved characteristics with respect to permeability over capsules of the prior art. It is a further object of the present invention to provide capsules using wall material of a well-defined composition having assured constancy from one batch to another. It is a further object of the present invention to provide capsules having walls of relatively inexpensive material with improved physical characteristics. It is an additional object of the present invention provide capsules having walls of an inorganic, glass-like, composition.

An object of the present invention is to provide capsule manufacturing processes for producing capsules described in the above-named objects of the invention. These and other objects have been or will be made apparent to workers skilled in the art, by disclosure expressed and implied in this patent application.

The capsule manufacturing process of this invention utilizes alkali metal water glasses in the preferred embodiments. The water glasses are, in some instances, acidified and in some instances subjected to cation exchange to yield polysilicic acids in aqueous solution and then the polysilicic acids are complexed with hydroxyl-containing materials to provide the material of the liquid-liquid phase separation for use in capsule walls.

Liquid-liquid phase separation in the present invention, comprises a liquid solution emergent phase relatively concentrated in a complex combination of hydrophilic polymeric material and hydroxyl-containing material.

In practicing the present invention, a polyethylene glycol phase-separation-inducing material is used to cause and maintain the phase separation.

The liquid-liquid phase separation of the present invention is, in some respects, similar to the so-called "simple coacervation" of the prior art in that electrical charges on the polymeric materials are apparently not responsible for the phase separation. On the other hand, the present liquid-liquid phase separation can be considered to be similar to so-called "complex coacervation" of the prior art in that a complex of two polymeric materials are concentrated in the emergent liquid phase. Similarities of the liquid-liquid phase separation of this invention with respect to phase separation mechanisms of the prior art are herein indicated only in an attempt to increase understanding of the phase separation phenomenon. Complete understanding of the mechanism is, of course, not required to practice the present invention and the above-discussed phenomena are not intended to limit the invention.

The process of the present invention, set out in general terms, includes the following steps:

(a) creating a three-phase system of (i) a major continuous, phase of aqueous liquid having a relatively low concentration of siliceous material and hydroxy-containing material, (ii) a minor, discontinuous, phase of aqueous liquid solution having a relatively high concentration of a complex of siliceous material and hydroxy-containing material and, (iii) a minor, discontinuous, phase of finely-divided intended capsule core material substantially immiscible with either of the other phases;

(b) agitating the system, once created, to cause dispersion of the intended capsule core material as individual entities and to cause the individual entities to be wet and enwrapped by globules of the aqueous liquid minor phase to yield liquid-walled embryonic capsules; and (c) treating the embryonic capsules to solidify the capsule walls, The word "siliceous" in regard to the present invention means of or containing silicic acid or silicates in solution or sol form. Siliceous material includes polysilicic acid and polysilicates in aqueous solution available for complexing with hydroxy-containing compounds.

The word "aqueous" in regard to the present invention means including water. That is, an aqueous solution is a solution which includes water or which is soluble with water. An ethanol or propanol solution, having some water content, is regarded as an aqueous system in the process of this invention.

The words "sol" and "solution" are considered herein to be equivalent.

The source for siliceous material can be alkali metal silicate solutions, silicic acid esters, partially hydrolyzed esters of silicic acid, silicon halides and the like. A preferred source, in the interest of economy, is commercially available water glass.

Hydroxy-containing materials which have been found eligible for use in practice of the present invention are, generally, glycols and glycerine. Specifically, materials most preferably utilized as hydroxy-containing complexing compounds include polyethylene glycols having a molecular weight of from about 400 to about 6000. Such materials are inexpensive and commercially obtainable in pure form.

Capsule internal phase material in capsules of the present invention can be any of a multitude of different kinds and types of materials. The most important criteria in selection of the materials which are eligible for use as the internal phase of capsules are: (a) that the intended internal phase material be substantially water insoluble and (b) that the intended capsule internal phase material be substantially non-reactive with other components of the capsule or coacervate film manufacturing system. A few of the materials which can be utilized as capsule internal phases include, among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water insoluble metallic oxides and salts; fibrous materials, such as cellulose or asbestos; substantially water insoluble synthetic polymeric materials; minerals, pigments; glasses; elemental materials, including solids, liquids and gases; flavors, fragrances; reactants; biocidal compositions; physiological compositions; fertilizer compositions, and the like. In short, the materials which can be contained in capsules manufactured by the process of the present invention, can differ not only among themselves in their physical states, which can be solid, liquid, gas, or combinations thereof, but can differ in their chemical composition and in their intended use. The capsule wall materials provide protection for the capsule internal phase materials, such as, protection from ambient conditions, protection from oxidation or ultraviolet radiation, protection from evaporation, from crystallization in solution, and the like.

Liquid, embryonic, capsule walls, once formed, are hardened to yield solid, glassy-walled, capsules. It has been found that any method for hardening the capsule wall material can be used which has the effect of removing water from the liquid capsule wall film. One such method includes addition of excess hydroxy-containing material to drive the siliceous material more completely out of solution.

Another method for hardening the liquid, embryonic, capsule wall material is by adding water miscible organic solvent to the capsule manufacturing system. Such a solvent as ethanol, for example, is eligible for use in hardening the capsule wall material. Use of an organic solvent in hardening the capsule wall material may not be applicable when the capsule internal phase material is dissolved by the hardening organic solvent.

The preferred method for hardening liquid capsule wall material of this invention, includes addition of inorganic salts reactive with the siliceous capsule wall component to yield walls of solid, insoluble, silicate salts. It has been determined that very small amounts of such reactive inorganic salts are required to harden the capsule wall material. An excess of the reactive salts should be guarded against because such an excess may cause local hardening, cracking and flaking of the siliceous capsule wall material. Examples of eligible reactive inorganic salts include, for example, aluminum sulfate, calcium chloride, magnesium sulfate, iron chloride, magnesium bromide and the like. The most preferred inorganic hardening salt is magnesium bromide and it is usually used in an aqueous solution having a concentration of about 2 to about 5 percent, by weight, of the salt. Of course, the hardening salts may also be used in solutions containing other than water, such as alcoholic solutions, when alcohol can be used. The concentration of hardening salts may vary from salt to salt and from specific capsule system to specific capsule system. An amount of the hardening salt is required adequate for hardening, but not in excess to cause degradation of the capsule wall quality. Simple tests can be conducted which involve immersing embryonic capsules into hardening salt solutions of several concentrations to determine an optimum concentration for a particular salt.

Capsules made according to the process of the present invention are substantially spherical, have seamless walls, and are not limited either as to size or as to internal phase contents. The broad range of internal phase contents was hereinabove disclosed and the size range of capsules made by the present invention can extend from a lower limit of a few to several microns up to a larger limit of several thousand microns in average diameter. The usual size for capsules made according to the present process are from about one or two microns to about 15,000 microns in average diameter. Capsules of the aforementioned size are considered to be minute and are preferred. The most usual size for capsules manufactured according to the present invention is within a range of from about five microns up to about 2,500 microns. Capsules made according to the present invention can be made to contain a range of amounts of internal phase material. The capsules can contain from 0 to more than 99 percent, by weight, of the internal phase material. The most usual and preferred range for the amount of material to be contained in capsules manufactured according to the present invention is from about 50 to about 97 percent, by weight. The aforementioned capsules having zero contents are considered to be minute spheres of polymeric material and can be manufactured by the process of the present invention by omitting the intended internal phase material.

The invention, having been disclosed hereinabove in a general manner, will now be described with reference to specific examples. The examples contained below are intended to demonstrate the broad principles of the invention, and should not be considered as limiting the invention in any way.

DESCRIPTION OF PREFERRED EMBODIMENTS

Example I

In this example, aluminum powder having an individual particle size of from about 600 to about 800 microns is encapsulated by a separated liquid phase of silicic acid and polyethylene glycol. The silicic acid can be prepared by stirring sodium water glass having a composition of about $Na_2O/2.06\ SiO_2$ and a concentration about 24–30 percent, by weight, with cation exchange resin in an amount sufficient to remove the sodium ions. The resulting silicic acid sol, having a specific gravity of about 1.28, can be separated from the exchange resin by filtration.

The silicic acid solution should be used immediately after preparation. Otherwise, a polymerization reaction will slowly occur, in which the silicic acid is changed to an insoluble, hard form which will not form a liquid phase.

Fifty milliliters of the silicic acid sol, 50 milliliters of water and 10 grams of the aluminum powder are combined, under agitation, in an appropriately-sized vessel. It can be noted that there are no microscopically detectable changes occurring at the aluminum-solution interface.

A solution of one part water and one part polyethylene glycol having a molecular weight of about 1000 is slowly added to the agitating system of silicic acid and aluminum powder. After addition of about 20 milliliters of the aqueous polyethylene glycol solution, phase separation is apparent and after addition of about 2 milliliters more of the solution, embryonic capsules are completed. Under microscopic observation, individual aluminum powder particles are observed to be coated with emerged, liquid, capsule wall material. Agitation of the system, now containing embryonic capsules, is maintained and 10 drops of a 2 percent, by weight, aqueous solution of aluminum sulfate are added to harden the siliceous capsule wall. After agitating for about 30 minutes, more aluminum sulfate solution is added to the system. This further addition appears to render the capsule wall water insoluble and the addition is followed by cessation of agitation, decanting the liquid and washing the capsules with water. That wash water is decanted and the capsules are washed with ethanol and then dried. Capsules prepared by the technique of Example I, above, have exhibited an internal phase content of more than 80 percent, by weight, and have demonstrated protection of the encapsulated aluminum in concentrated hydrochloric acid.

Example II

In this example, a liquid hydrocarbon oil is encapsulated by the process of the present invention. The silicic acid for this example can be prepared by stirring sodium water glass having a composition of about $Na_2O/2.06\ SiO_2$ and a concentration of about 10 percent, by weight, with cation exchange resin in an amount sufficient to remove the sodium ions. The resulting silicic acid sol, having a specific gravity of about 1.1 can be separated from the exchange resin by filtration.

Twenty-five milliliters of the silicic acid sol, 50 milliliters of water and 25 milliliters of the oil are combined under conditions of strong agitation to yield a fine dispersion of the oil in the aqueous liquid. About 6 grams of polyethylene glycol having a molecular weight of about 6000 is added dropwise to yield a liquid, siliceous phase of capsule wall material. The agitation can be slowed and liquid-walled capsules are formed. The capsule walls are hardened by adding 5 percent, by weight, aqueous solution of magnesium bromide, dropwise, to the agitating system.

Example III

In this example, previously manufactured capsules containing butyl acetate within a gelatin capsule wall are to be encapsulated in a silicate second wall. Twenty-five milliliters of silicic acid, such as that in Examples I or II above, are combined, under agitation, with 50 milliliters of water and 10 grams of the capsules which are to form the internal phase material for the present example. Polyethylene glycol having a molecular weight of about 6000 is added dropwise until embryonic liquid walls are deposited about the gelatin walls of the internal phase capsules. The liquid walls can be hardened by addition of an aqueous magnesium bromide solution. In practice of this example, an unexpectedly large amount of the glycol was required (15 grams), possibly due to some characteristics of the internal phase material.

Example IV

In this example, aluminum powder is again encapsulated using a silicic acid solution; but the silicic acid is prepared by a method set out in U.S. Pat. No. 2,408,656 cited above. Preparation of the silicic acid is as follows:

"To 816 parts by volume of water was added 429 parts by volume of 4.5 normal hydrochloric acid solution. To this solution there was added with vigorous agitation 1755 parts by volume of a sodium silicate solution which was 1.70 molar with respect to $SiO_2:Na_2O$ weight ratio of 3.25. A sol was obtained which had a pH of 2.5. This sol was permitted to age for 50 minutes at 26° C. There was then added 4.5 normal hydrochloric acid solution with stirring until the pH of the mixture had been lowered to 1.7. There was thus obtained about 3000 parts by volume of low molecular weight polysilicic acid solution.

"To 400 parts by volume of the polysilicic acid solution there was added 80 parts by volume of normal propanol and the mixture was stirred well for five minutes. To the mixture was then added 120 parts by weight of sodium chloride and the mixture was stirred for 10 minutes. The mixture was then allowed to separate gravitationally for about 50 minutes. After this time the mixture had settled into two layers.

"The lower of these two layers was found to contain salt and water, together with some silicic acid. The upper layer, 51.6 parts by volume, had a pH of 2.5 and consisted essentially of normal propanol associated with a substantial amount of polysilicic acid as a complex, the proportion of polysilicic acid being 10.1 percent by weight expressed as $SiO_2$.

"The polysilicic acid in the complex was found to be relatively stable against polymerization during standing, being ungelled even after several days storage. As prepared and even after prolonged standing the solution was a clear, mobile liquid which had a true viscosity and gave no evidence of thixotropy."

The upper layer of polysilicic acid and propanol is separated from the system and that is diluted with an equal volume of propanol. To that solution is added 10 grams of aluminum powder and then about 10 grams of polyethylene glycol (molecular weight, 6000) is added dropwise to yield a separated, liquid, siliceous capsule wall material which wets and enwraps the individual aluminum particles. The deposited capsule wall material can be hardened by addition, to the system, of about 10 milliliters of 5 percent, by weight, aqueous solution of magnesium bromide.

It should be noted that the process of the above-referenced patent is used only for preparing a silicic acid system and not for producing a liquid-liquid phase separation.

As an indicator of concentrations of materials used in preferred embodiments of the present process it can be noted that the capsule manufacturing system, taken as a whole but excluding the capsule internal phase material, can include from about 2 to about 15 percent, by weight, solid siliceous material and from about 5 to about 20 percent, by weight, hydroxy-containing material.

What is claimed is:

1. A process for manufacturing minute capsules, en masse, including the following steps:
   (a) establishing a three-phase system of (i) a major, continuous, phase of aqueous liquid having a relatively low concentration of siliceous material and hydroxy-containing material, (ii) a minor, discontinuous, phase of aqueous liquid solution having a relatively high concentration of a complex of siliceous material and hydroxy-containing material and, (iii) a minor, discontinuous, phase of finely-divided intended capsule core material substantially immiscible with either of the other phases; the siliceous material being selected from the group consisting of polysilicic acid, alkali metal silicates and partially hydrolyzed and unhydrolyzed esters of silicic acid and the hydroxy-containing material being selected from the group consisting of glycerine and polyethylene glycol;
   (b) agitating the system to cause dispersion of the intended capsule core material as individual entities and to cause the individual entities to be wet and enwrapped by globules of the aqueous liquid minor phase to yield liquid-walled embryonic capsules; and
   (c) treating the embryonic capsules to solidify the capsule walls by reacting the siliceous capsule wall material with an inorganic salt selected from the group of inorganic salts consisting of aluminum sulfate, calcium chloride, magnesium sulfate, iron chloride, and magnesium bromide.

2. A process for manufacturing minute capsules, en masse, including the following steps:
   (a) establishing an agitating, aqueous capsule manufacturing vehicle of siliceous material; the siliceous material being selected from the group consisting of polysilicic acid, alkali metal silicates and partially hydrolyzed and unhydrolyzed esters of silicic acid;
   (b) dispersing into the vehicle intended capsule core material substantially immiscible and unreactive with the manufacturing vehicle;
   (c) introducing polyethylene glycol into the agitating dispersion as a liquid-liquid phase-separation-inducing material to yield a separated liquid phase relatively concentrated in siliceous material enwrapping the capsule core entities and forming embryonic capsules dispersed in the liquid of the manufacturing vehicle; and
   (d) treating the embryonic capsules to solidify the capsule walls by reacting the siliceous capsule wall material with an inorganic salt selected from the group of inorganic salts consisting of aluminum sulfate, calcium chloride, magnesium sulfate, iron chloride, and magnesium bromide.

3. A process for manufacturing minute capsules, en masse, including the following steps:
   (a) establishing an agitating, aqueous capsule manufacturing vehicle of siliceous material; the siliceous material being selected from the group consisting of polysilicic acid, alkali metal silicates and partially hydrolyzed and unhydrolyzed esters of silicic acid;
   (b) introducing polyethylene glycol into the agitating vehicle as a liquid-liquid phase-separation-inducing material to yield a two-liquid-phase system of separated liquid phase relatively concentrated in siliceous material and continuous aqueous liquid relatively dilute in the siliceous material;
   (c) dispersing into the two-phase system, intended capsule core material substantially immiscible and unreactive with the system to form embryonic capsules of capsule core entities individuadlly enwrapped by separated liquid phase of siliceous material; and
   (d) treating the embryonic capsules to solidify the capsule walls by reacting the siliceous capsule wall material with an inorganic salt selected from the group of inorganic salts consisting of aluminum sulfate, calcium chloride, magnesium sulfate, iron chloride, and magnesium bromide.

4. A minute, seamless, substantially spherical capsule containing a substantially water immiscible internal phase and having a solid capsule wall of a complex combination of polyethylene glycol and a siliceous material selected from the group consisting of polysilicic acid, alkali metal silicates and partially hydrolyzed and unhydrolyzed esters of silicic acid.

References Cited

UNITED STATES PATENTS

| 3,179,600 | 4/1965 | Brockett | 252—316 X |
| 2,991,226 | 7/1961 | Millar et al. | 424—33 X |
| 2,408,656 | 10/1946 | Kirk | 252—309 |
| 2,800,457 | 7/1957 | Green et al. | 252—316 |
| 3,016,308 | 1/1962 | Macaulay | 252—316 X |

FOREIGN PATENTS

| 931,148 | 7/1963 | Great Britain | 252—316 |

RICHARD D. LOVERING, Primary Examiner

U.S. Cl. X.R.

117—62.2, 100 A, 100 B, 100 M; 264—4; 424—16, 32, 37